United States Patent [19]

Eickmann

[11] Patent Number: 4,913,100
[45] Date of Patent: Apr. 3, 1990

[54] DOUBLE PISTON ENGINE

[76] Inventor: Karl Eickmann, 2420 Isshiki, Hayama-machi, Kanagawa-ken, Japan

[21] Appl. No.: 286,565

[22] Filed: Dec. 19, 1988

Related U.S. Application Data

[63] Continuation-in-part of Ser. No. 196,649, May 20, 1988, Pat. No. 4,864,979.

[51] Int. Cl.[4] .............................................. F02B 41/00
[52] U.S. Cl. .................................. 123/26; 123/61 R; 123/62
[58] Field of Search ............. 123/51 BD, 53 BP, 56 B, 123/59 B, 61 R, 61 V, 62, 26

[56] References Cited

U.S. PATENT DOCUMENTS

| | | | |
|---|---|---|---|
| 1,663,638 | 3/1928 | Lugt | 123/61 R |
| 1,890,813 | 12/1932 | Heinzelmann | 123/61 R |
| 2,051,204 | 8/1936 | Elwell | 123/61 R |
| 2,295,037 | 9/1942 | Hedges | 123/61 R |
| 3,340,856 | 9/1967 | Brown | 123/61 R |
| 3,340,857 | 9/1967 | Brown | 123/61 R |
| 3,955,543 | 5/1976 | Brown | 123/61 R |

FOREIGN PATENT DOCUMENTS 321514 11/1929 United Kingdom .................. 123/61

Primary Examiner—David A. Okonsky

[57] ABSTRACT

A double piston engine has a doubly acting piston reciprocably provided in a cylinder arrangement to form two working chambers which periodically increase and decrease their volumes. The invention provides inlet means with supply means for a cleaning flow through the working chambers and inlet means and supply means for a loading flow in excess of atmospheric pressure to the respective chambers. Means are further provided to secure that the loading flow enters the respective working chamber after the closing of the inlet for the cleaning flow. By this arrangement of the invention it becomes possible to operate two cycle engines with turbo-chargers or other loaders. A very powerful engine at compact space and low weight is obtained, while the poisonous gases of two stroke engines are prevented to a high degree.

9 Claims, 6 Drawing Sheets

DOUBLE PISTON ENGINE

REFERENCE TO RELATED APPLICATIONS

This is a continuation-in-part of application Ser. No. 07/196,649, filed May 20, 1988 and now U.S. Pat. No. 4,864,979.

This application is related to Ser. No. 07-275,500 filed on Nov. 23, 1988.

Benefits of these applications and of their fore-runners are claimed for this present application.

DESCRIPTION OF THE PRIOR ART

Four stroke engines clean the cylinders effectively and thereby provide good engines with little poisenous exhaust. Contrary thereto the common two-stroke or two-cycle engines fail to clean the cylinders affectively from the gases of the earlier power stroke. Such common two cycle engines can also not be turbo charged because the higher pressure turbo flow would flow to a great percentage out of the cylinders into the still open exhaust ports. The mentioned two-cycle engines therefore require improvements which are provided by the present invention.

SUMMARY OF THE INVENTION

The main object of the invention is to provide an effective double piston engine with low poisenous exhaust and with the power of double piston two-cycle engines.

Another object of the invention is to provide a cleaning flow and a loading flow to each working chamber of the double piston engine with the loading flow entering into the respective working chamber after the inlet of the cleaning flow has been closed.

Further objects of the invention are, to provide the cleaning flow from the crank case, a charger or another chamber, while the loading flow under pressure higher than the atmospheric pressure of the surrounding is provided by a turbo-charger, or by a separated chamber of the main engine with the mentioned separated chamber or chambers provided axially of the main cylinder or inside of the medial hollow portion of the piston.

A final object of the invention is to connect the pistons of two double piston cylinder sets to two by angularly ninety degrees turned eccentric bearing portions of a common crankshaft in order to obtain four power strokes with equal time intervalls in the engine.

BRIEF DESCRIPTION OF THE DRAWINGS

FIGS. 1 to 5 are longitudinal sectional views through embodiments of the present invention, while

DESCRIPTION OF THE PREFERRED EMBODIMENTS

Figure 1:
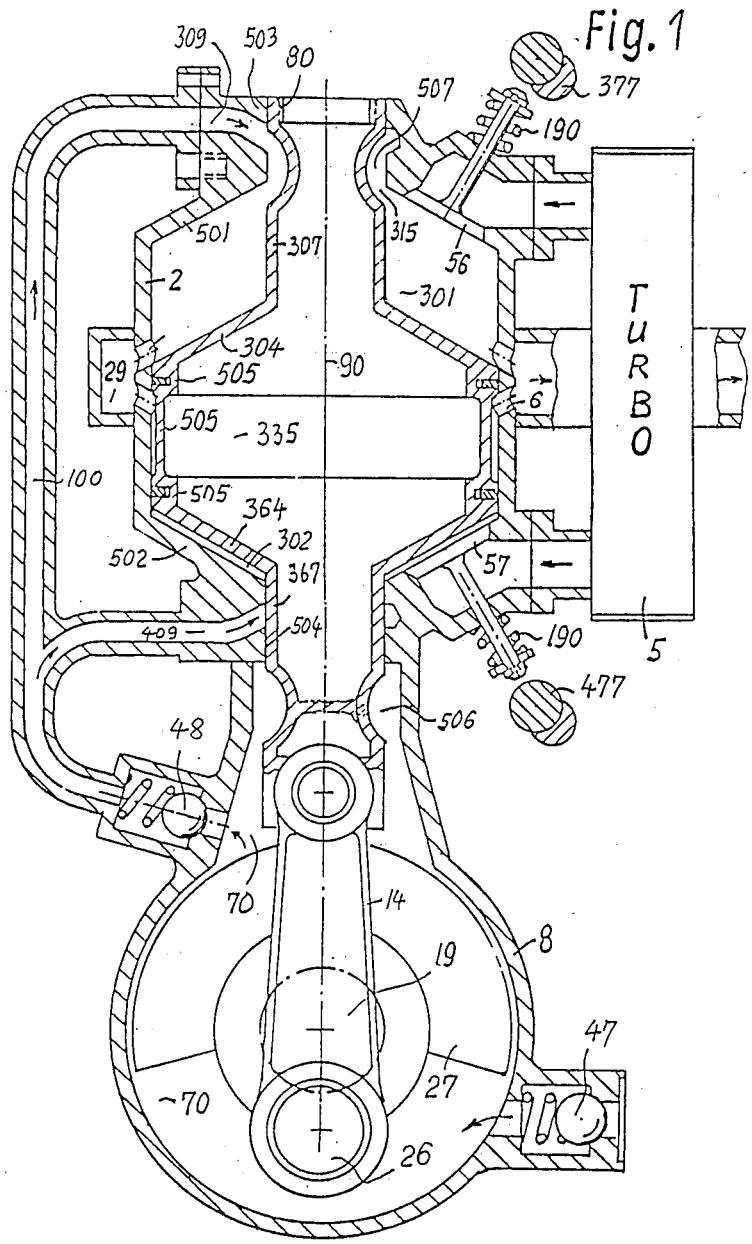

In FIG. 1 the housing 2 of basically cylindrical configuration is provided with covers 501 and 502. The housing is connected to the crankshaft housing 8. Connecting rod 14 connects the eccentric bearing portion 26 of the crankshaft 19 (with counter weight 27) to one end of the piston, which reciprocates in the housing 2. This piston has a medial portion 505 which fits sealingly in cylinder 2. Endwards of wall portions 304,364 the piston forms the piston shafts 307 and 367. The shafts 307 and 367 are sealingly guided in end portions 503 and 504 of the covers 501 and 502, respectively. During the reciprocal movement of the piston assembly in the cylinder housing 2, two working chambers 301 and 302 are formed, which periodically and relative after each other, increase and decrease their volumes. This basic structure is assumed to be known in the art.

According to the invention, the working chambers will be cleaned by a flashing flow and thereafter be loaded by an inflow of air or of air-fuel mixture. This loading flow will have a higher than atmospheric pressure and will appear timely after the flashing flow.

This principle of the invention shall prevent outflow of fuel particles from two cycle engines and also increase the power and environment friendliness of the engine.

The engine of FIG. 1 now acts, according to the invention, as follows:

Air is drawn into the crankshaft housing 8 through inlet valve 47. At the next 180 degrees turn of the crankshaft 19, the intaken air becomes compressed and delivered from housing 8 over exit valve 48 into fluid line 100, from where it enters either over port 409 into chamber 302 or over port 309 into chamber 301. The entering into these chambers occurs, when one of the recesses 506 or 507 of a shaft 307 or 367 meets one of the ports 309 or 409 to form with it an entrance passage 315. At this time the medial piston portion 505 opens the exhaust slots 6. The now described flow is the flashing-flow or cleaning flow and it serves to press all unclean particles out of the respective working chamber 301 or 302. As soon as the piston assembly moves and closes the passage 315, the loader flow from the turbo loader stage of the turbo 5 starts to flow into the respective working chamber 301 or 302. This occurs by the opening of the loader flow inlet valve 56 or 57, respectively. The opening and closing of these loader-flow inlet valves 56 and 57 may be done by cam shafts 377 or 477, respectively and/or with help by springs 190.

As soon as the respective working chamber 301 or 302 is filled with enough loader fluid under higher than atmospheric pressure, the respective inlet valve 56 or 57 closes and the compression in the respective working chamber starts. After firing of the air-fuel charge at the end of the compression stroke, the expansion of the hot gases starts and the then higher pressure in the respective chamber drives the piston assembly for the power stroke. After the end of the respective power stroke, the used gases flow out through respective outlet slots 6 and over collection chamber 29 into the turbine of the turbo charger 5 to drive this turbine. The power of the expanding (burning) gases is transferred over the connecting rod 14 to the crankshaft 19 of the engine, from where the useful work can be taken off.

The feature of this arrangement of the invention is, that in the double piston engine four separate inlet means are provided, two thereof for a cleaning flow and two for a loading flow. In two cycle engines the loading flow would partially flow out of the working chambers through the exhaust ports 6. This has prevented heretofore the uses of turbo chargers in two-stroke engines. Since due to the invention the loading flow valves open after the exhaust ports are closed, no fluid from the loading flow can escape during the loading and compression stage. The loading flow can thereby be a fuel-compressed air- mixture without the risk of losses of fluid and afterburning in the exhaust. At the same time this arrangement of the invention provides a most powerful and effective engine without excessive poisenous exhaust in a compact device of little weight.

Figure 2:
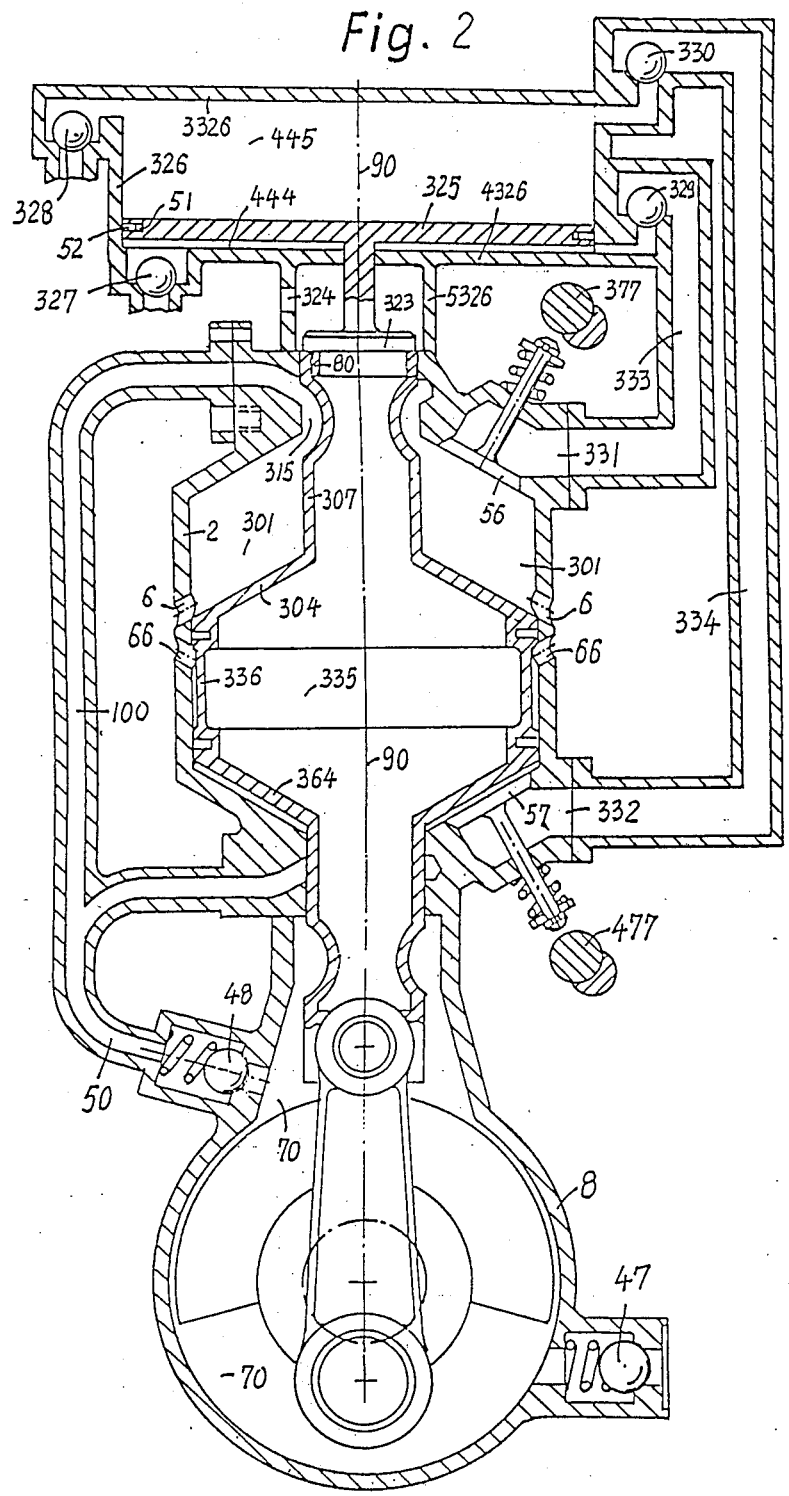

In FIG. 2 the turbo-charger of FIG. 1 is replaced by a loading piston 325 in a respective housing 326. Piston 325 is connected to piston shaft 307 by connecter 80,323,324 and its shaft extends through the bottom cover 4326 of housing 326. The piston 325 forms two chambers 444 and 445 in housing 326. These chambers have entrance- and exit- means (f.e.valves) 327 to 330, respectively. The exit means 329,330 lead to passages 333,334 respectively, which then lead individually to one of the loader flow inlet valves 56 and 57. Since piston 325 is connected to the main piston assembly via shft 307, it reciprocates in unison with the main piston assembly. Thereby it serves the purpose of loading with the same aim as the turbo of FIG. 1. It replaces the turbo of FIG. 1.

Figure 3:
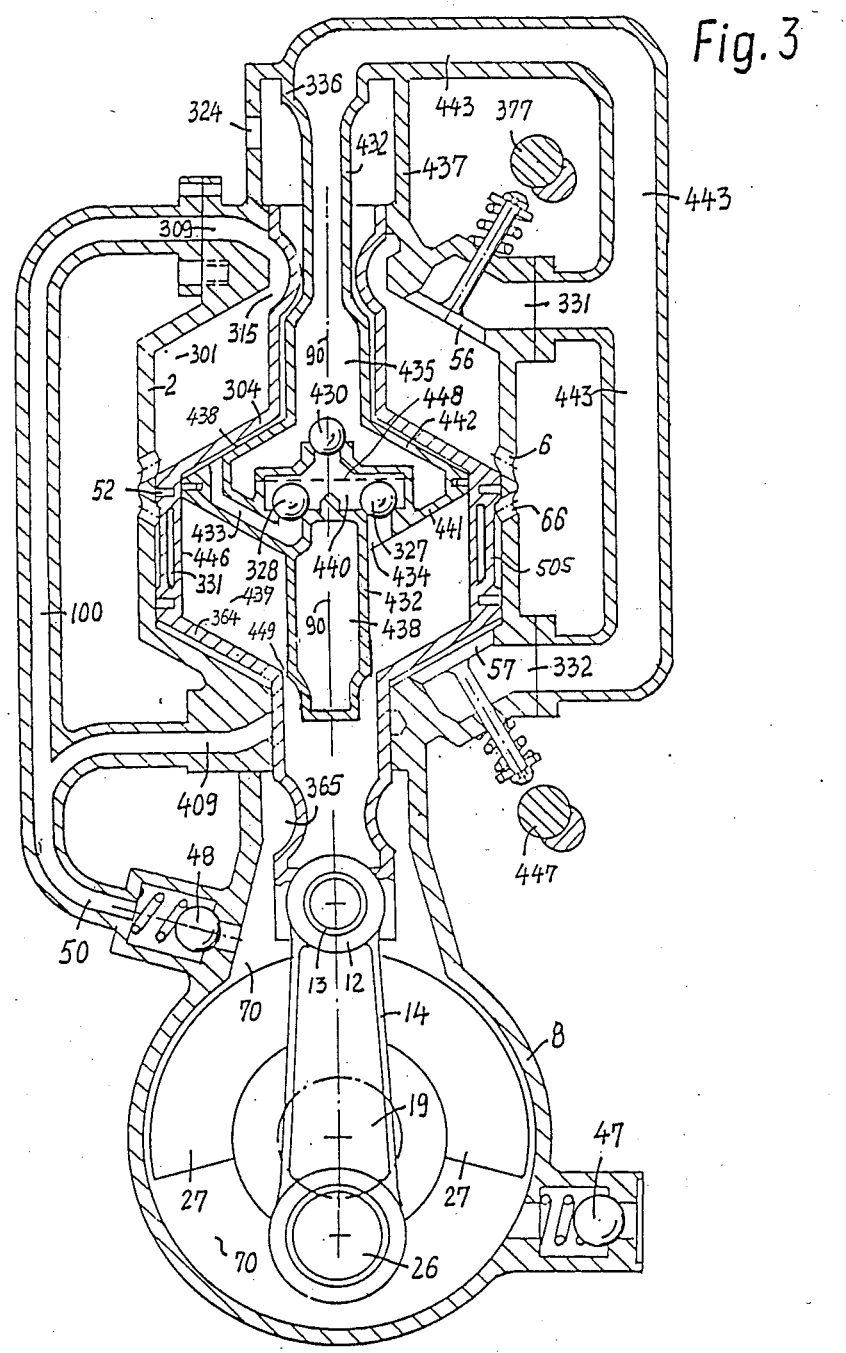

In FIG. 3 the main means of the loading arangement are provided inside of the medial piston portion 505 of the main piston assembly. Since the piston and its piston shafts are at least partially hollow, the interior space of its medial portion provides a possibility to assemble a compressor or loader arrangement in it. That is done by extending through the hollow shaft 307 a holding pipe 432 which is fastened to the top of housing 2 to prevent a reciprocation of holding pipe 432. Pipe 432 holds inside of the medial portion 505 of the piston assembly a stationary body 441 which seals along face 446 inside of piston portion 505. This stationary body has passages 433 and 434 with thereon provided inlet valves 328 and 327. Chambers 438 and 439 are formed endwards of body 441 in the hollow space inside of piston portion 505. During the reciprocation of the main piston assembly, chambers 438 and 439 alternatingly expand and compress, whereby the flows of intaken air which flow through the hollow shafts into the chambers 438, 439 become passed through valves 327 and 328 into chamber 435, from where the so compressed flow of air or air-fuel mixture flows over passage 443 and ports 331 or 332 towards the inlet valves 56 and 57, respectively. Otherwise FIGS. 2 and 3 operate similar to FIG. 1.

Figure 4:
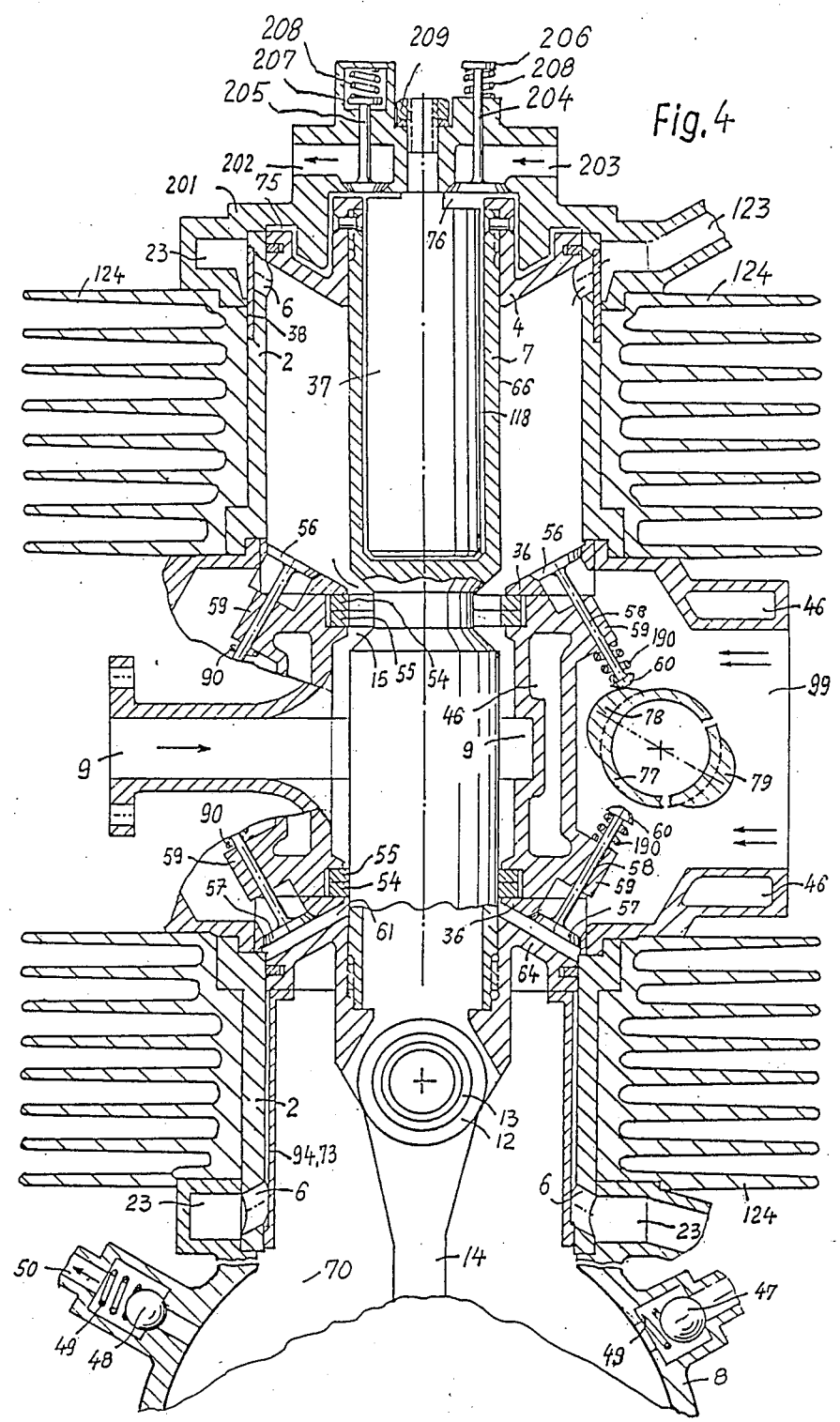

In FIG. 4 the piston assembly consists of a medial piston shaft 7 which has on its axial ends the pistons 4 and 64. The covers of the cylinders are then in the middle between the cylinder portions 2, they are shown by 36, and the exhaust slots 6 are then close to the axial ends of the cylinders 2. The working chambers are 1 and 61. The medial shaft has an annular control groove 15 which opens temporarly the inlet passage 9 to chamber 1 and at another time to chamber 61 to send the cleaning or flashing flow through the respective working chambers 1 and 61. Covers 36 are additionally provided with inlet valves 56 and 57, respectively, which, after control groove 15 closes in the medial guide portion by 54,55 are opened by the controllers 78,79 of cam shaft 77, respectively, to lead the loader flow through these valves 56,57 at the respective timing into the working chambers 1 and 61, respectively. It is possible, in addition to this basic arrangement, to provide an additional chamber 75 by adding a closing cover 201 to the upper end of cylinder 2. The cover 201 has then inlet means 203,204 and outlet means 202,205. It is then possible to obtain one flow from the crankshaft housing 8 and another flow from the chamber 75. One thereof, may, if so desired, be used as a loading flow, if no turbo charger is provided. But commonly both are used as cleaning flows, while the loading flow is obtained from a turbo-charger.

Figure 5:
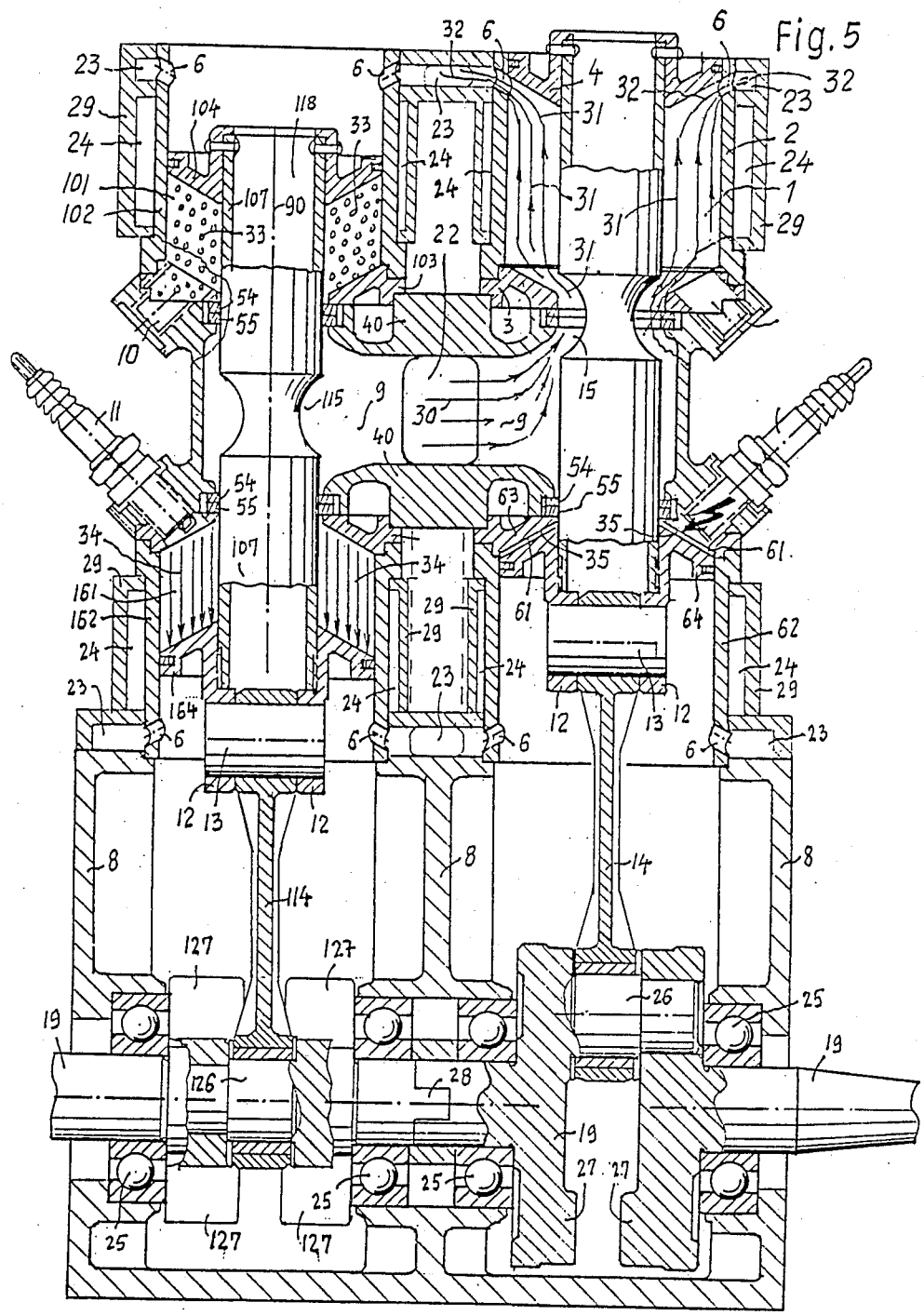

In FIG. 5 two of the double piston cylinders are mounted side by side, while the double pistons are connected by connecting rods 14 and 114 to the 90 degrees angularly spaced eccentric bearing portions 26,126 of the common crankshaft 19. Thereby 4 working chambers, namely 6,61,33 and 34 act timely after each other. This results in a relative even torque of the crankshaft with four working strokes per each revolution of the crank shaft.

Figure 6:
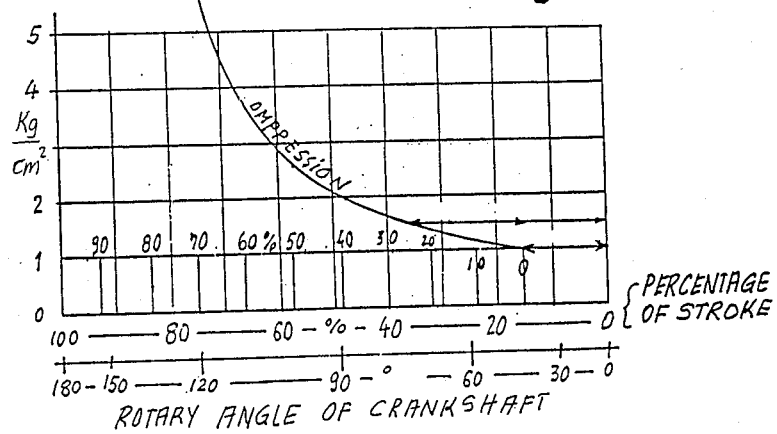
FIGS. 6 and 7 show graphic illustrations of functions of the engine of the invention.
Figure 7:
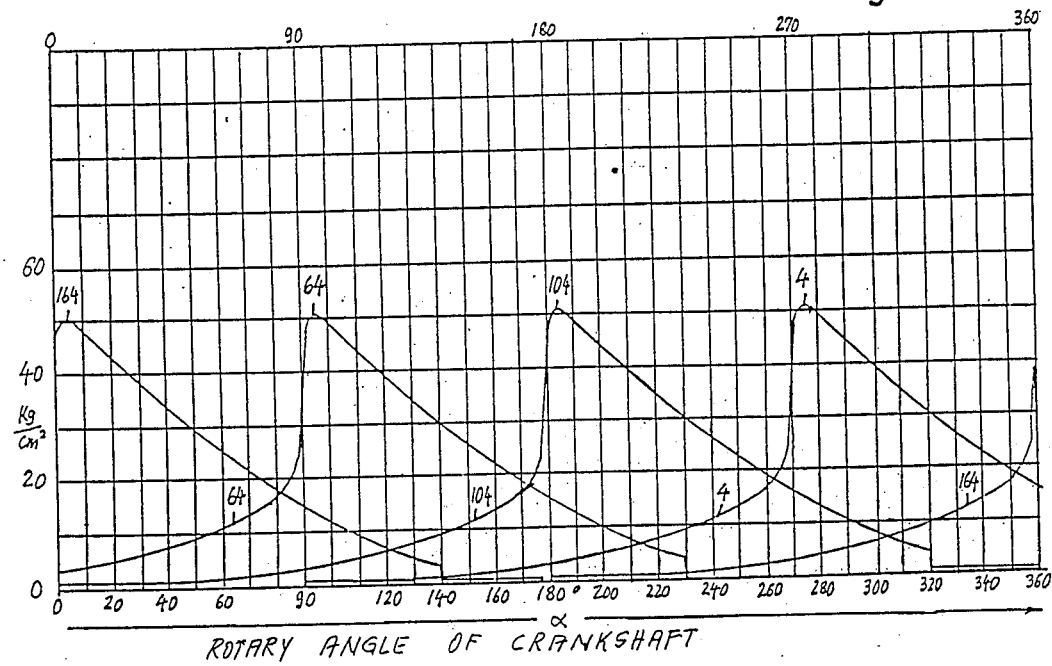

FIG. 6 illustrates the timing of cleaning and loading of the respective working chamber over the rotary angle "alpha" of the crankshaft, and:

FIG. 7 illustrates the pressure diagrams of the four working chambers of FIG. 5 over the rotary angle "alpha" of the crank shaft.

What is claimed is:

1. In a double piston engine, comprising, in combination,
    a piston assembly reciprocably provided in a cylinder which has covers, whereby two individual working chambers are formed, which peridically one after the other increase and decrease their volumes and wherein inlet means and outlet means are provided to said chambers, and an improvement,
    comprising separate individual inlet means for a cleaning flow,
    separate individual inlet means for a loading flow of pressure in excess of atmospheric pressure,
    wherein actuating means are provided to close the inlet means for said cleaning flow while additional opening means are provided to the inlet means for said loading flow, with said additional opening means responsive to the rotary angle of a crankshaft and for opening said inlet means for said loading flow timely soon after the closing of said inlet means for loading flow for said cleaning flows, and;
    wherein two chambers, separated by a stationary body, are formed inside of a medial and hollow portion of said piston of said engine to be communicated individually to two of said inlet means.

2. The engine of claim 1,
    wherein said cleaning flow is provided by a crankshaft housing, while said loading flow is provided by a turbo-charger.

3. The engine of claim 1,
    wherein the inlet means of one of said flows is controlled by providing grooves and the inlet means to the other of said flows is provided by individual inlet valves, with said valves bordering said working chambers.

4. The engine of claim 1 wherein two of said double pistons are provided with connecting rods which are connected to eccenctric bearings offset 90 degrees on said crankshaft.

5. The engine of claim 1,
    wherein said two chambers inside of said medial hollow portion communicate with individual valved passages.

6. In a double piston engine, comprising, in combination,
    a piston assembly reciprocably provided in a cylinder which has covers, whereby two individual working chambers are formed, which peridically one after the other increase and decrease their volumes and wherein inlet means and outlet means are provided to said chambers, and an improvement
    comprising separate individual inlet means on each of said separate working chambers for a cleaning flow, separate individual inlet means for a loading flow in excess of atmospheric pressure with said inlet means for both said cleaning flow and loading flow being provided on the axial outer end portions of said cylinder while said outlet means are located in the medial portion of said cylinder, wherein actuating means are provided to close the inlet means for said cleaning flows while additional opening means are provided to the inlet means for said loading flow, with said additional opening means responsive to the rotary angle of a crankshaft and for opening said inlet means for said loading flow timely soon after the closing of said inlet means for said cleaning flows.

7. The engine of claim 6,
wherein said cleaning flow is provided by the crankshaft housing, while said loading flow is provided by a turbo-charger.

8. The engine of claim 6,
wherein the inlet means of one of said flows is controlled by providing grooves and the inlet means to the other of said flows is provided by individual inlet valves, with said valves meeting said working chambers.

9. The engine of claim 6, wherein two of said double pistons are provided with connecting rods which are connected to eccencctric bearings offset said 90 degrees on said crankshaft.

* * * * *